Figure 8:
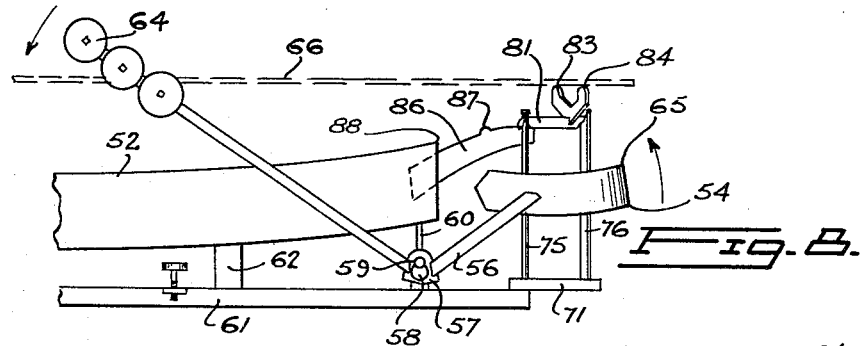

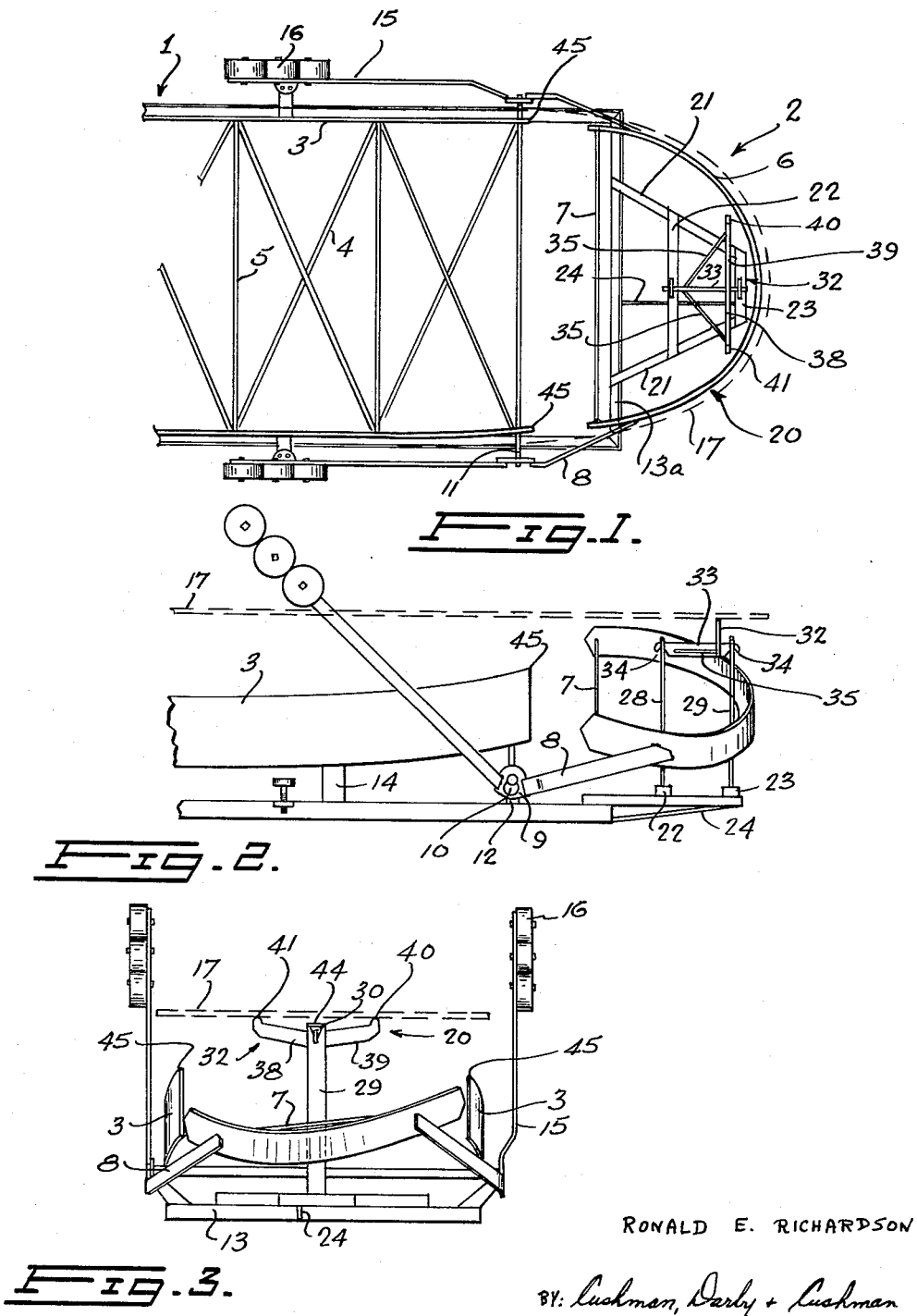

Nov. 30, 1965 R. E. RICHARDSON 3,220,820
GLASS BENDING APPARATUS WITH PIVOT SUPPORT POINTS
Filed July 6, 1961 4 Sheets-Sheet 2
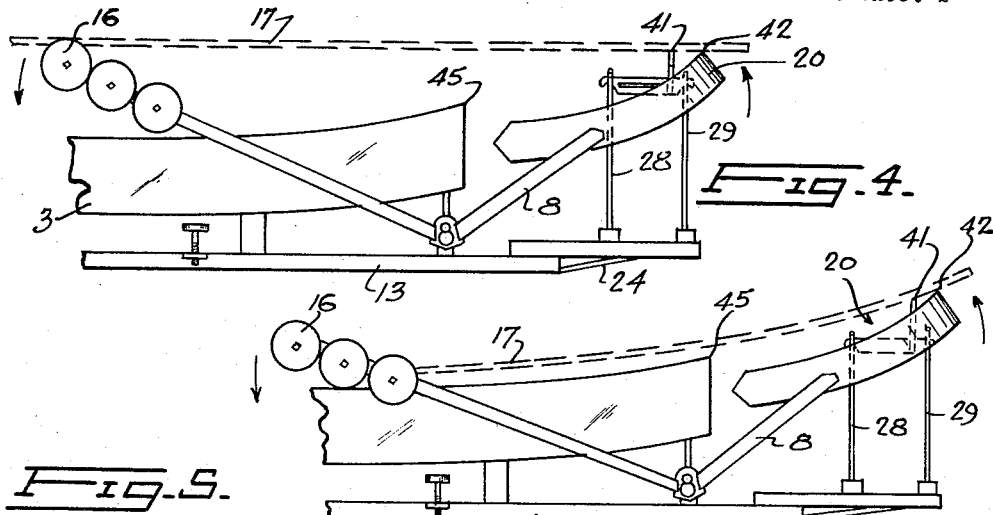
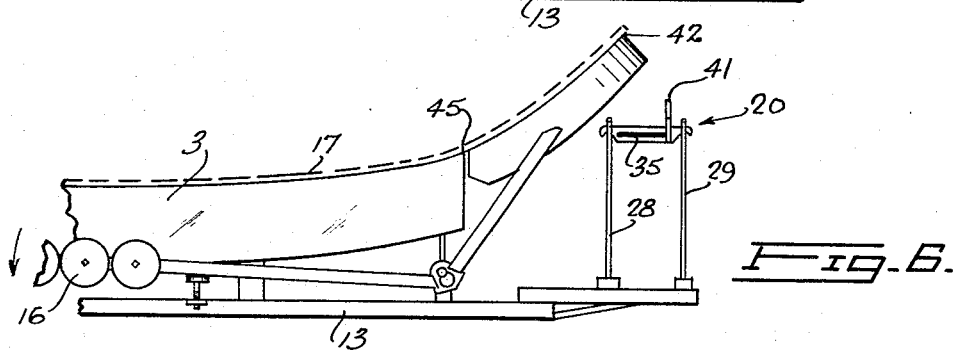
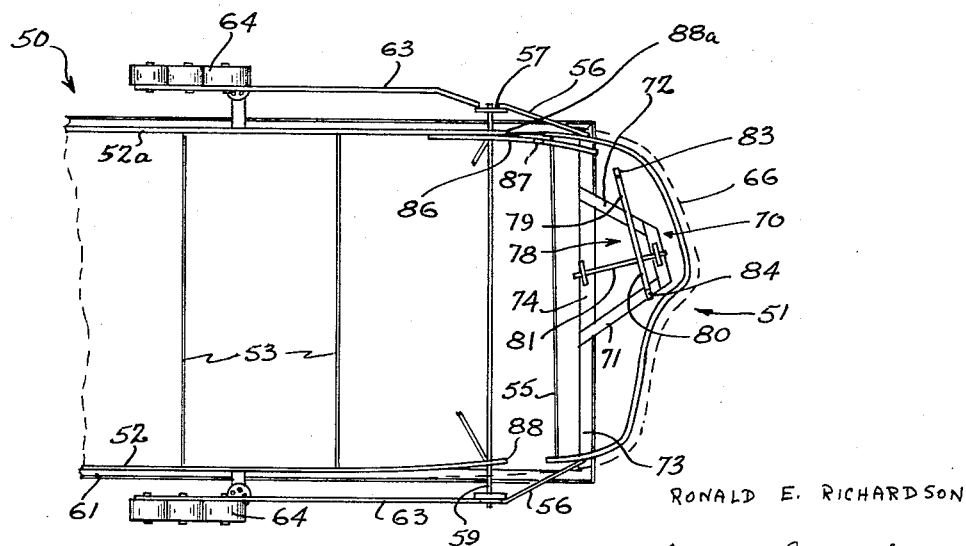
RONALD E. RICHARDSON
BY: Cushman, Darby & Cushman
ATTORNEYS

RONALD E. RICHARDSON

Nov. 30, 1965   R. E. RICHARDSON   3,220,820
GLASS BENDING APPARATUS WITH PIVOT SUPPORT POINTS
Filed July 6, 1961   4 Sheets-Sheet 4
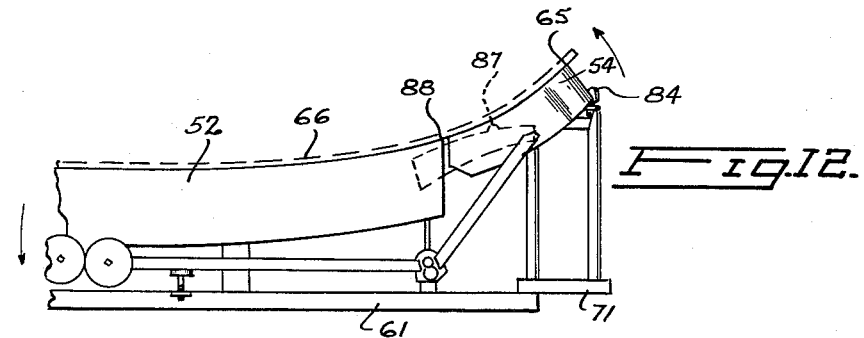
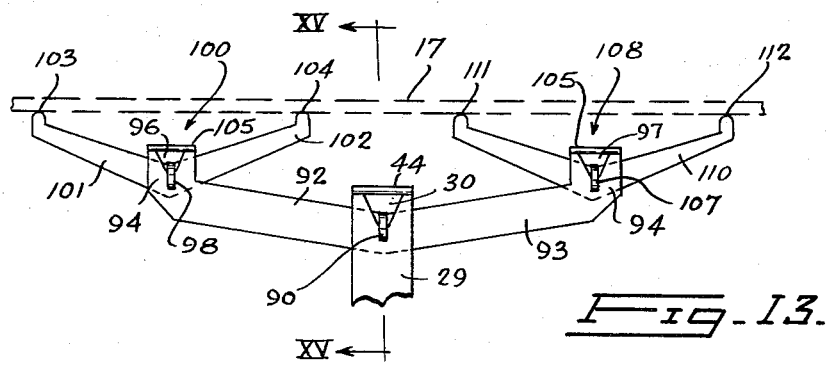
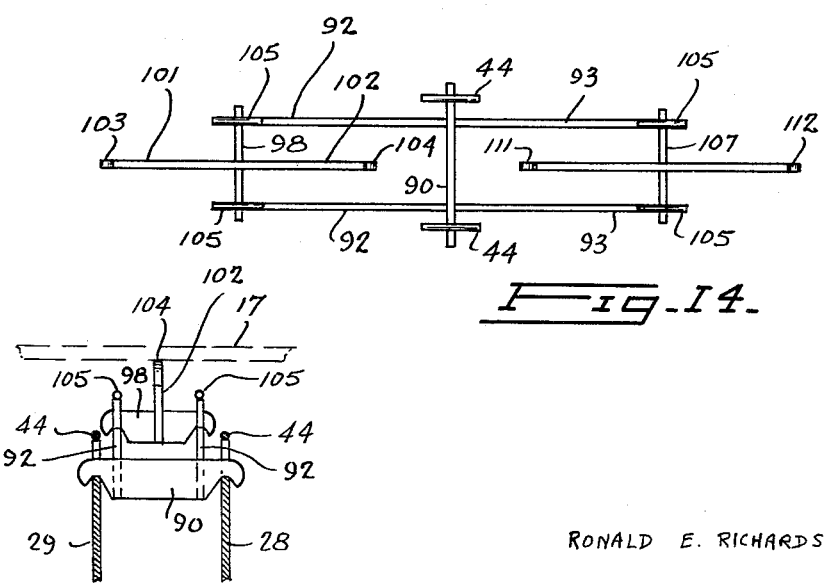
RONALD E. RICHARDSON
BY: Cushman, Darby & Cushman
ATTORNEYS though the glass sheet is made to conform after being
bent by exposure to a suitable high temperature.

United States Patent Office 3,220,820
Patented Nov. 30, 1965

3,220,820
GLASS BENDING APPARATUS WITH PIVOT
SUPPORT POINTS
Ronald E. Richardson, Oshawa, Ontario, Canada, assignor
to Pittsburgh Plate Glass Company, Pittsburgh, Pa.
Filed July 6, 1961, Ser. No. 122,194
Claims priority, application Canada, May 16, 1961,
823,550
9 Claims. (Cl. 65—290)

This invention relates to improvements in the construction of concave multi-part skeleton type moulds employed in the bending of elongated flat glass sheets to a desired curvature and especially to moulds of this type which are employed in the bending of glass sheets for automobile windshields and rear windows.

Such a multi-part skeleton type mould has a center section and end sections pivotally connected to the center section. In some moulds the center section is fixed to a mould support member whereas in others the center section is permitted to move vertically with respect to a mould support member. In both of these cases the pivoted end sections are biased, usually by means of weights so that they tend to move from an open position to a closed position, corresponding respectively to open and closed positions of the mould. When it is in the closed position the mould presents a curved shaping surface with which the glass sheet is made to conform after being bent by exposure to a suitable high temperature.

Initially, the flat, cold glass sheet is placed on the mould with the end sections in the open position and is supported at a relatively few spaced points two of which are constituted by the extreme end tips of the mould. The weight of the glass sheet serves to hold the end sections in their open positions against the action of the biasing force tending to move the end sections to the closed positions. Upon heating of the glass to bending temperature, the glass softens with the result that the downward force exerted by the glass sheet on the end sections diminishes and the end sections gradually move upwardly towards their closed positions. At the completion of the bending operation when the end sections are fully closed, and the mould is said to be in the closed position, the end sections serve to define together with the center section a continuous concave shaping surface adapted to impart the desired curvature to the glass sheet.

Modern trends in automobile design call for the use of increasing larger glass sheets in windshields and rear windows and for curvatures of increasing complexity. The production of these large sheets of complex curvature on skeleton type moulding surfaces involves several difficulties. One difficulty arises from the fact that the glass shaping rails constituting the portion of the shaping surface presented by the center section of the mould frequently have an upward curvature at the parts thereof adjacent to the glass shaping rail or rails of the end sections of the mould. The longitudinal extremities of the center section rails are therefore raised above the level of the remainder of these rails with the result that when the glass sags longitudinally as it bends towards the shaping surface the first points of contact of the glass sheet with the shaping surface, other than the points of initial support mentioned above, are at the raised extremities of the center section rails. If the glass remains in contact with these raised extremities for too long a period of time during the bending operation, kinking of the sheet is liable to occur.

Another difficulty arises from the fact that kinking of the tips of the glass sheet can result from the force exerted on the tips of the sheet during the early part of the bending operation while the sheet is solely or primarily supported by the tips of the end sections during bending. The larger size of modern automobile glass means that greater supporting force is necessary than was the case with the smaller sheets of the prior art.

Yet another difficulty arises from the fact that the design of automobile glass now frequently demands the provision of curvature transversely of the longest dimension of the glass sheet. This makes it necessary to use a skeleton type mould having some portions of its shaping surface much lower than others and hence farther removed from the glass sheet during the initial stages of the bending operation. Since the metal of which the mould is constructed exercises a chilling effect on glass located adjacent thereto, there is a tendency for unequal heating between the two sides of the glass sheet with the result that sagging tends to occur at the side of the sheet where the shaping surface is farthest removed from the glass. This difficulty is especially prevalent when producing sheets which have a curvature containing a compound bend including both a pronounced longitudinal curvature and pronounced transverse curvature; much of the automobile glass now being produced falls into this category.

Still another difficulty arises from the pronounced degree of asymmetry about their longitudinal axes of the glass sheets used for producing the more complex forms of automobile glass presently in vogue. With such sheets a higher proportion of the weight of the sheet lies at one side of the mould than at the other. When the sheet is supported only at its tips there is a danger that the sheet will slip out of place during the bending operation and, even if it does not fall off the mould, will fail to be bent to the proper curvature.

It is an object of the present invention to provide a mould construction having at least two support points for the glass sheet which are located longitudinally outwardly of a longitudinal extremity of the center section of the mould but longitudinally inwardly of the outer extremity of an end section of the mould, each of these support points remaining in contact with the glass sheet for substantially the same length of time during the bending operation.

A further object of the invention is to provide an improved method for providing additional support for a glass sheet during a bending operation in which the sheet is supported adjacent the tips thereof while exposed to bending temperature.

The invention provides an apparatus for bending glass sheets comprising a concave glass bending mould of the multi-part skeleton type movable between an open position for receiving an elongated flat glass sheet thereon and a closed position peripherally defining a shaping surface to which said glass sheet is to conform after bending, said mould including a main mould portion comprising first and second glass-shaping rails extending longitudinally of the mould and an end mould portion pivotally connected to one end of said main mould portion about a first axis angularly disposed with respect to a longitudinal dimension of the mould, said mould further including support means for supporting the glass sheet during the bending thereof located inwardly of the longitudinal extremity of said end mould portion, the improvement comprising pivot means for providing a second axis of pivoting angularly disposed with respect to said first axis attached to said apparatus and wherein said support means comprises an arm mounted for free pivotal movement about said pivot means, said arm having an upper surface comprising means for providing upwardly extending first and second support points for contact by the lower surface of said glass sheet during movement of the mould from the open to the closed position, said first and second support points being located on opposite sides of said pivot means longitudinally outwardly of longitudinal extremities of said first and second glass-shaping rails but longitudinally inwardly of the outer extremity of said end mould portion.

The invention further provides in a method of bending an elongated glass sheet comprising supporting the sheet adjacent the tips thereof and exposing it to bending temperature whereby to cause the sheet to sag into contact with a shaping surface including a main portion and an end portion pivotally movable relative to said main portion, the improvement which comprises the steps of providing additional support for said sheet during bending at first and second support points spaced apart from one another transversely of said sheet and contacting the sheet intermediate a longitudinal extremity of said main portion of the shaping surface and the longitudinal extremity of said end portion of the shaping surface and maintaining said additional support for an equal period of time at both of said first and second support points.

Figure 9:
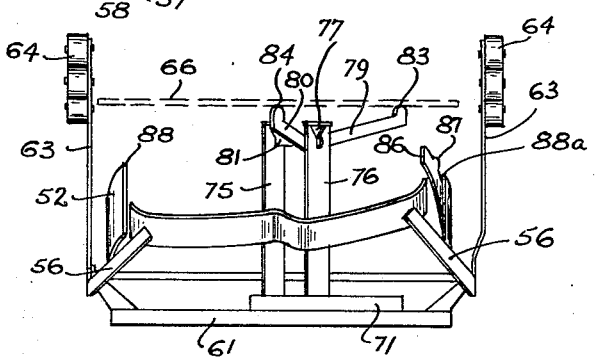
Figure 10:
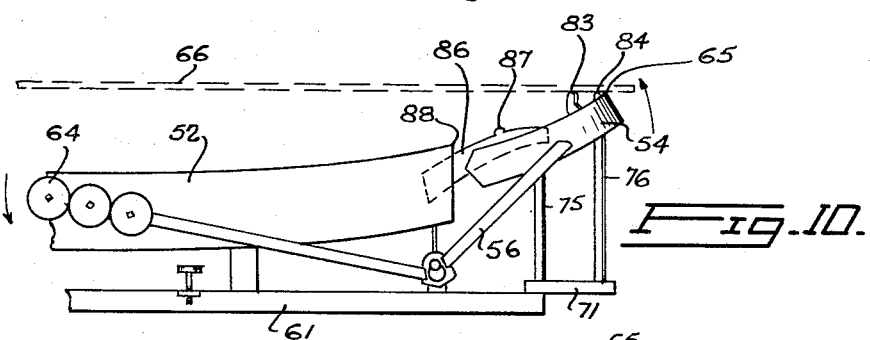
Figure 11:
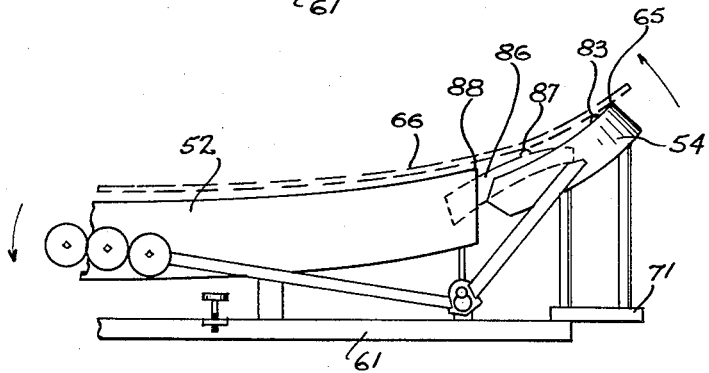

The invention will be described by way of illustration and without limitation with reference to the accompanying drawings wherein:

FIGURE 1 is a plan view of a skeleton type concave glass bending mould, only half of the mould being illustrated since the mould is symmetrical, FIGURE 2 is a side view of the mould of FIGURE 1, FIGURE 3 is an end view of the mould of FIGURE 1, FIGURE 4 is a side view of the mould of FIGURE 1 as disposed at the beginning of a bending operation, FIGURE 5 is a further side view of the mould of FIGURE 1 part way through the bending operation, FIGURE 6 is a further side view of the mould of FIGURE 1 after completion of the bending operation, FIGURE 7 is a plan view of half of a symmetrical skeleton type glass bending mould constituting a further embodiment of the invention, FIGURE 8 is a side view of the mould of FIGURE 7, FIGURE 9 is an end view of the mould of FIGURE 7, FIGURE 10 is a side view of the mould of FIGURE 7 at the beginning of a bending operation, FIGURE 11 is a further side view of the mould of FIGURE 7 part way through the bending operation, FIGURE 12 is a further side view of the mould of FIGURE 7 at the completion of a bending operation, FIGURE 13 is a side view of a modified form of glass-supporting device, FIGURE 14 is a plan view of the device of FIGURE 13, and FIGURE 15 is an end view of the device of FIGURE 13.

The mould of FIGURE 1 comprises a main mould portion 1 and a movable end mould portion 2. The main mould portion 1 comprises side rails 3 and bracing members 4. The bracing provided by the bracing members 4 is reinforced by vertically disposed upstanding plates 5 extending transversely across the mould and secured at their ends to the main side rails 3. The end mould portion 2 comprises a curved end rail 6, a main bracing member 7 and subsidiary bracing members which have been omitted for the sake of clarity but which extend between the main bracing member 7 and the curved end rail 6. To each end of the end rail 6 there is secured by a strut 8 a plate 9 provided with a keyhole slot 10. At each side of the mould there is mounted a grooved pivot pin 11 supported on a rod 12 secured to and extending upwardly from a mould supporting frame 13 to which the side rails 3 are connected by support members 14. The keyhole slots 10 are formed with upper portions having a diameter only slightly greater than the inner diameter of the grooves in the pivot pins 11 and less than the diameter of these pins, and with lower portions of a diameter greater than that of the pivot pins 11. By passage of the pivot pins 11 into the lower portions of the slots 10, the edges of the upper portions of the slots 10 may be lowered into engagement with the grooves of the pivot pins 11 thereby to mount the end section 2 for pivotal movement relative to the main mould portion 1 about a first axis angularly disposed with respect to the longitudinal dimenison of the mould. Arms 15 carrying counterweights 16 are secured to the plates 9 and tend to urge the end mould portion 2 upwardly from an open mould position, where the longitudinal outer extremity of the end rail 6 supports the under surface of a flat glass sheet 17, towards a closed position where, as shown in FIGURE 6, the inner ends of the end rail 6 form a contiguous, smooth continuation of the side rails 3.

The mould also includes an intermediate supporting device generally designated 20 carried by a supporting framework comprising two bars 21 secured to and extending from the end piece 13a of the mould supporting frame 13. The bars 21 are joined by two cross-pieces 22 and 23, additional strength being imparted to the framework by means of a strut 24 extending between the end piece 13a and the cross-piece 23. A plate 28 is secured to and extends upwardly from the cross-piece 22 and a similar plate 29 is secured to and extends upwardly from the cross-piece 23. The upper edge of each of the plates 28 and 29 is formed with a V-shaped notch 30 as best seen in FIGURE 3 in respect of the plate 29. The notches 30 are located along a line which extends substantially parallel to the longitudinal axis of the mould. A glass-supporting arm 32 is arranged to pivot upon the plates 28 and 29 by means of a plate 33 secured to the arm 32 and extending at right angles thereto. Each end of the plate 33 is provided with a V-shaped notch 34. The notches 34 engage the notches 30 so that the plate 33 is thereby mounted for free pivotal movement about a second axis which is angularly disposed with respect to the above mentioned first axis and which, in the present embodiment, is actually substantially parallel with the longitudinal axis of the mould. Struts 35 interconnect the plate 32 and the plate 33 to provide increased rigidity. The arm 32 which, being secured to the plate 33, is freely pivotable about an axis substantially parallel with the longitudinal axis of the mould, includes two limbs 38 and 39 carrying at their ends upstanding lugs 40 and 41. The latter are located on opposite sides of the longitudinal axis and laterally inward of the plan outline of the end mold section when the latter occupies its open position respectively for providing first and second support points for contact by the sheet 17. Accidental disengagement of the plate 33 from its bearings in the plates 28 and 29 is prevented by means of rods 44 secured across the top ends of the plates 29 and serving to close the notches 34.

In FIGURES 2 and 3 the mould is shown with the end section 2 held downwardly so as to reveal the manner in which the upstanding lugs 40 and 41 contact a flat glass sheet 17 when the latter is loaded on to the mould. FIGURE 4 shows the mould in the normal open position where the end section 2 has been allowed to pivot under the action of the counterweights 16 and the tip 42 of the end section 2 is in contact with the sheet 17. The position of FIGURE 4 is thus that which is assumed by the sheet 17 and the end section 2 of the mould at the moment when the sheet 17 has just been loaded onto the mould prior to introduction of the mould into a bending lehr. It will be noted that the end portion of the sheet 17 which is shown in the drawings is supported at three points, i.e. by the tip 42 of the end section 2 and by the upper surfaces of the lugs 40 and 41. The sheet 17 is well out of contact with the longitudinal extremities 45 of the center section rails 3 but it can readily be observed that when bending of the sheet 17 takes place in the bending lehr the longitudinal extremities 45 are the first parts of the moulding surface as a whole, other than the tip 42 of the end section 2, with which the sheet 17 would come into contact but for the additional intermediate support provided by the lugs 40 and 41. Furthermore it will be noted that the longitudinal extremities 45 are at a higher level than the adjacent portions of the center section rails 3 so that a considerable time could elapse between the initial contact of the glass sheet with the longitudinal extremities 45 and its subsequent contact with portions of the center section rails 3 located farther inwardly than the longitudinal extremities 45. The upward pressure exerted by the longitudinal extremities 45 could therefore prevail for a sufficient length of time to cause a danger of kinking of the sheet adjacent to the longitudinal extremities 45.

However the provision of the intermediate support afforded by the lugs 40 and 41 serves to keep the sheet 17 from sagging onto the longitudinal extremities 45 for a considerable length of time. This is illustrated in FIGURE 5 which shows the situation prevailing part way through the bending operation. A considerable degree of bending of the sheet 17 has occurred at this stage but the additional intermediate support provided by the lugs 40 and 41 has restrained the glass from sagging downwardly onto the longitudinal extremities 45.

The bending of the sheet 17 proceeds until a point is reached where the end section 2 moves upwardly sufficiently towards its closed position to lift the sheet 17 off the lugs 40 and 41. At this point the sheet 17 may sag into contact with the longitudinal extremities 45 but the length of time for which it remains in contact with them before the mould reaches its closed position and the bending operation has been completed, as shown in FIGURE 6, is very short. Kinking of the sheet in the vicinity of the longitudinal extremities 45 of the rails 3 is therefore avoided. Also, the load at the tip of the glass sheet where the sheet is in contact with the tip 42 of the end section 2 is reduced by the upward force exerted on the glass sheet 17 by the lugs 40 and 41 during the first part of the bending operation. Kinking of the sheet 17 adjacent the tips 42 of the end section 2 is therefore also avoided.

Furthermore, as shown in exaggerated manner in FIGURE 2, at the beginning of the bending operation there is a considerable difference in the degree of separation between the two sides of the glass sheet 17 and the portions of the end rail 6 which lie beneath them. As seen in FIGURE 2 the far side of the end rail 6 is located at a higher level than the rear side thereof. This unequal separation between the opposite sides of the sheet 17 and the opposite sides of the end rail 6 is dictated by the nature of the curvature which is to be imparted to the sheet. It has the result that the end rail 6 exercises a greater chilling effect on one side of the sheet than the other side of the sheet during the bending operation. This causes a tendency for unequal heating of the two sides of the sheet 17 with the consequence that the side of the sheet farthest separated from the end rail 6 becomes hot more quickly than the other side of the sheet and tends to sag downwardly to a greater extent than is tolerable for the production of a satisfactorily bent sheet. Such undesirable sagging of one side of the sheet 17 by comparison with the opposite side thereof is however minimized in the mould described because the tendency for it to occur is counteracted by the upward force exerted by the lug 41. In other words the lug 41 provides physical support for the side of the sheet 17 which would tend to sag because it is farther separated from the end rail 6 than the opposite side of the sheet and therefore receives less chilling from the end rail 6.

It will be appreciated that the upwardly directed forces which it is desired to exert upon the sheet 17 by the lugs 40 and 41 respectively are not necessarily equal. Provision can however readily be made for this since the distribution of the load upon the lugs 40 and 41 depends on the ratio between the lengths of the limbs 38 and 39. This ratio can be varied to meet prevailing requirements. In the mould shown in FIGURES 1 to 6 the limbs 38 and 39 are of equal length but when applying the invention to a mould having different structural characteristics, it might be found that a larger proportion of the load is to be taken by one of the lugs than by the other. If the proportion of load to be carried by the lug 41 is greater than that to be carried by the lug 40, the arm 38 will be lengthened or the arm 39 shortened.

The proportion of load carried by the two lugs 40 and 41 may not be constant during the bending operation where a complex curvature is being imparted to the sheet. However because of the fact that the arm 32 can pivot freely about an axis substantially parallel with the longitudinal axis of the mould, variations in the ratio of the loads carried by the lugs 40 and 41 will not have the effect of bringing one of these lugs out of contact with sheet 17. For example if the load on the lug 41 increases while that on the lug 40 decreases, the arm 32 will simply move in an anticlockwise direction as viewed in FIGURE 3. Such movement of the arm 32 is of course limited to an arc corresponding to the angle of the V-shaped notches 30 in the plates 28 and 29 but this degree of movement is sufficient for practical purposes.

It will be realized that since the mould is symmetrical the sheet 17 receives intermediate support not only at the first and second support points provided by the lugs 40 and 41 but also at third and fourth support points provided by lugs similar to the lugs 40 and 41 but located at the opposite end of the mould.

The mould shown in FIGURES 7 to 12, which constitutes a second embodiment of the invention, comprises a main mould portion 50 and a movable end mould portion 51. The main mould portion 50 comprises side rails 52 and 52a and bracing members 53. The end mould portion 51 comprises a curved end rail 54 and a bracing member 55. To each end of the end rail 54 there is secured by a strut 56 a plate 57 provided with a keyhole slot 58. At each side of the mould there is mounted a grooved pivot pin 59 supported upon a rod 60 secured to and extending upwardly from a mould supporting frame 61 to which the side rails 52 and 52a are connected by support members 62. The keyhole slots 58 are formed with upper portions having a diameter only slightly greater than the inner diameter of the grooves in the pivot pins 59 and less than the diameter of these pins, and with lower portions of a diameter greater than that of the pivot pins 59. The end section 51 is mounted for pivotal movement relative to the center section 50, about a first axis angularly disposed with respect to the longitudinal dimension of the mould, by passing the pivot pins 59 into the lower portions of the slots 10 and lowering the edges of the upper portions of the slots into engagement with the grooves of the pivot pins. Arms 63 carrying counterweights 64 are secured to the plates 57 and serve to urge the end portion 51 to move upwardly from an open position (shown in FIGURE 10), where the tip 65 of the end rail 54 supports the lower surface of a flat glass sheet 66, to a closed position (shown in FIGURE 12) where the inner ends of the end rail 54 form a substantially contiguous smooth continuation of the side rails 52.

An intermediate supporting device 70 is carried by a framework comprising two bars 71 and 72 secured to and extending from the end-piece 73 of the mould supporting frame 61, the ends of the bars 71 being interconnected by a cross-piece 74. The bar 71 is somewhat longer than the bar 72 and the cross-piece 74 is therefore disposed at an angle to the end piece 73. A plate 75 is secured to and extends upwardly from the end-piece 73 while a similar plate 76 is secured to and extends upwardly from the cross-piece 74 parallel to the plate 75. The upper end of each of the plates 75 and 76 is formed with a V-shaped notch 77 (see FIGURE 8) and a glass-supporting arm 78, which comprises two limbs 79 and 80 of unequal length, is mounted for pivotal movement on the plates 75 and 76 by means of a plate 81 provided adjacent each end with a V-shaped notch 82. The notches 82 interengage the notches 77 so as to mount the plate 81, and therewith the glass-supporting arm 78, for free pivotal movement about a second axis at right angles to the planes of the plates 75 and 76, this second axis being angularly disposed with respect to the first axis about which the end section 51 is pivotally movable. The limbs 79 and 80 of the glass-supporting arm 78 carry upstanding lugs 83 and 84 respectively providing first and second support points for contact by the sheet 17. The upper ends of the notches 77 are closed by rods 85 secured thereto to prevent accidental displacement of the plate 81.

A fixed intermediate support member consisting of a plate 86 provided with an upstanding lug 87 extends longitudinally outwardly and upwardly from the side rail 52a and is so disposed that the lug 87 is above the shaping surface presented by the end rail 54 when the mould is in the open position (see FIGURE 10) but below the shaping surface when the mould is in the closed position (see FIGURE 12). The lug 87 provides an additional support point for the sheet 17.

The provisions made for giving the glass sheet intermediate support in the mould of FIGURES 7 to 12 differ from those made in the mould of FIGURES 1 to 6 because of the difference of shape of the glass sheets 17 and 66. Whereas the sheet 17 has a regular outline substantially symmetrical about the longitudinal axis of the sheet the outline of the sheet 66 is highly irregular. It is therefore desirable that at the side of the sheet where the lug 83 bears upwardly on the sheet 66 the intermediate support provided by this lug should be reinforced by additional support means. This additional support means is constituted by the fixed lug 87. Also, the nature and disposition of the glass-supporting arm 78 is somewhat different from that of the glass-supporting arm 32. Whereas the arm 32 pivots about an axis which is parallel with the longitudinal axis of the mould, the arm 78 pivots about an axis which is at an angle of about 30° to the longitudinal axis of the mould. The disposition of the arm 78 at this angle serves to bring the lugs 83 and 84 into contact with the parts of the sheet 66 where the upward force exerted by the lugs is most effective. It will be observed that the arm 79 is longer than the arm 80; thus the lug 84 carrier a greater proportion of the load than the lug 83.

Except for the additional intermediate supporting force provided by the lug 87 the mode of operation of the mould of FIGURES 7 to 12 is generally similar to that of the mould of FIGURES 1 to 6.

At the beginning of the bending operation (FIGURE 10) the sheet 66 is supported at its end by the tip 65 of the end rail 54 and by the lugs 83 and 84 but is out of contact with the lug 87. However at an early stage in the bending (FIGURE 11) the weight of the sheet on the side above the lug 87 causes the glass to sag more quickly than on the opposite side of the sheet. The lugs 83 and 84 are still in contact with the sheet at this stage but the intermediate support provided by these lugs would not in itself be sufficient to keep the glass off the longitudinal extremity 88a of the side rail 52a, in the absence of the lug 87. However this premature sagging of one side of the sheet under its own weight is prevented from bringing the glass too soon into contact with the longitudinal extremity 88a by the provision of the lug 87, the upper surface of which is at a higher level than the longitudinal extremity 88a. At the stage shown in FIGURE 11 the sheet is thus provided with intermediate support at three points by the lug 87 and the lugs 83 and 84 while continuing to be urged upwardly by the tip 65 of the end rail 54. Ultimately the end section 51 has rotated upwardly a sufficient distance to lift the sheet off the lugs 83 and 84 and from then on intermediate support is provided only by the lug 87. Just before the bending operation is completed and the mould has reached the closed position (FIGURE 12) the sheet is lifted from the lug 87. Thus the lug 87 cooperates with the lugs 83 and 84 to keep the glass sheet off the longitudinal extremities 88 and 88a of the side rails 52 and 52a and to reduce the load on the tip of the end rail thereby reducing any tendency for kinking of the sheet at these locations.

Many variations are possible within the scope of the invention. For example, in an embodiment generally similar to that of FIGURE 12 it might be found that the glass sheet sags under its own weight to such an extent that the lug 87 is best arranged so as to be in contact with the sheet right from the commencement of the bending operation. Alternatively it is desirable in some cases to replace the support member 86 and its associated lug 87 by a glass-supporting member of the type described in my application Serial No. 96,846, filed March 20, 1961, now abandoned which extends outwardly and upwardly from the center section rail and has an upper surface which includes a plurality of successive support points for contact by the lower surface of the glass sheet during movement of the mould from the open to the closed position.

Another modification consists in providing the mould with a plurality of pivoted glass-supporting arms similar to the arm 32 of FIGURE 1 or the arm 78 of FIGURE 7. This affords spaced pairs of intermediate support points which may all be in contact with the sheet at the beginning of the bending operation and successively lose contact with the sheet as bending progresses. Alternatively one or more pairs of support points may be located below the sheet at the beginning of bending but come into contact with the sheet at a later stage to provide intermediate support which persists after the sheet has lost contact with the initial intermediate support points. It may be noted here that it is not essential for the intermediate support provided according to the invention to be effective right from the start of the bending operation. This is usually desirable but in some cases the pivoted glass-supporting member may become effective to provide intermediate support only after bending has commenced.

FIGURES 13 to 15 illustrate a modification of the mould of FIGURE 1. The plates 28 and 29 are retained but the plate 33 is replaced by a plate 90 provided adjacent its ends with V-shaped notches 91 which engage the notches 30 and thereby mount the plate 90 for pivotal movement about an axis parallel with the longitudinal axis of the mould. Two pairs of plates 92 and 93 extend outwardly from the plate 90 and are formed with upturned ends 94 and 95 provided with V-shaped notches 96 and 97. A plate 98 formed at each end with V-shaped notches 99 is mounted for pivotal movement upon the plates 92, the notches 99 engaging the notches 96. The plate 98 carries a glass-supporting arm 100 comprising limbs 101 and 102 bearing upturned lugs 103 and 104 at their ends. The plate 98 is prevented from being accidentally displaced from its bearings in the notches 96 by rods 105 which serve to close the upper ends of these notches. A plate 107 similar to the plate 98 is mounted in similar manner in the V-shaped notches 97 and carries a glass-supporting arm 108 comprising limbs 109 and 110 the ends of which are formed as upturned lugs 111 and 112.

As seen by comparing FIGURES 3 and 13 the load formerly carried by the lug 41 is now divided between the lugs 103 and 104 while the load formerly carried by the lug 40 is now divided between the lugs 111 and 112. Thus the modification of FIGURES 13 to 15 provides intermediate support at four points on the glass sheet 17 and because of the manner in which the lugs 103, 104, 110 and 112 are mounted this four-point support will remain in force until such time as the sheet 17 is moved upwardly to such an extent that contact is lost simultaneously with all of the lugs. Since an increase in the number of intermediate support points means that a smaller proportion of the load falls on each support point kinking and undesirable sagging is further reduced by use of this modification. In FIGURES 13 to 14 the arms 100 and 108 are shown as extending parallel with the plates 92 and 93 but it will be appreciated that in many cases the contour of the sheet 17 will be such that it is desirable for the arms 100 and 108 to be at an angle to the plates 92 and 93, possibly even at right angles thereto.

I claim:

1. In apparatus for bending glass sheets comprising a concave glass bending mould of the multi-part skelton type movable between an open position for receiving an elongated flat glass sheet thereon and a closed position peripherally defining a shaping surface to which said glass sheet is to conform after bending, said mould including a main mould portion comprising first and second glass-shaping rails extending longitudinally of the mould and an end mould portion pivotally connected to one end of said main mould portion about a first axis transversely disposed with respect to a longitudinal dimension of the mould, said mould further including support means for supporting the glass sheet during the bending thereof located inwardly of the longitudinal extremity of said end mould portion, the improvement comprising pivot means for providing a second axis of pivoting angularly disposed with respect to said first axis attached to said apparatus and wherein said support means comprises an arm mounted for free pivotal movement about said pivot means, said arm having an upper surface comprising means for providing upwardly extending first and second support points located laterally inward of the plan outline of the end mold section when the latter occupies its open position for contact by the lower surface of said glass sheet during movement of the mould from the open to the closed position, said first and second support points being located on opposite sides of said pivot means longitudinally outwardly of longitudinal extremities of said first and second glass-shaping rails but longitudinally inwardly of the outer extremity of said end mould portion, said movement of said arm about said pivot means serving to maintain said first and second support points in contact with the lower surface of said sheet for an equal period of time during movement of the mould from the open to the closed position.

2. The improvement according to claim 1 wherein said pivot means is so disposed that said second axis is substantially parallel to the longitudinal dimension of the mould.

3. The improvement according to claim 1 wherein said first and second support points are so disposed as to be in contact with the lower surface of said glass sheet in the open position of the mould.

4. The improvement according to claim 1 wherein said arm comprises first and second limbs of unequal length one on each side of said pivot means.

5. The improvement according to claim 1 wherein said arm has an upper surface providing a plurality of support points on each side of said pivot means.

6. The improvement according to claim 1 having a fixed support member providing at least one additional support point for contact with said glass sheet during movement of the mould from the open to the closed position, said additional support point being located between one of said first and second support points and the longitudinal extremity of one of said first and second glass-shaping rails.

7. The improvement according to claim 1 wherein each of said first and second glass-shaping rails has a longitudinal extermity disposed above the level of adjacent portions of the rail.

8. The improvement according to claim 1 wherein said mould further comprises an additional end mould portion pivotally connected to the other end of said main mould portion about a third axis angularly disposed with respect to said longitudinal dimension of the mould and a second pivot means providing a fourth axis angularly disposed with respect to said third axis and attached to said apparatus, an arm mounted for free pivotal movement about said second pivot means, said arm having an upper surface means for providing upwardly extending third and fourth support points for contact by the lower surface of the glass sheet during movement of the mould from the open to the closed position, said third and fourth support points being located on opposite sides of said second pivot means longitudinally outwardly of longitudinal extremities of said first and second glass-shaped rails but longitudinally inwardly of the outer extermity of said additional end mould portion, movement of said arm mounted for free pivotal movement about said second pivot means serving to maintain said third and fourth support points in contact with the lower surface of said sheet for an equal period of time during movement of the mould from the open to the closed position.

9. The improvement according to claim 1 wherein a first portion of the end mould section is located at a higher level than a second portion of said end mould section, said second portion being situated on the opposite side of the mould from said first portion.

References Cited by the Examiner

UNITED STATES PATENTS

| 2,814,164 | 11/1957 | Cason et al. | 65—290 |
| 2,861,395 | 11/1958 | Richardson | 65—290 |
| 2,872,756 | 2/1959 | Jendrisak | 65—288 |

FOREIGN PATENTS

| 226,692 | 2/1960 | Australia. |
| 567,341 | 11/1958 | Belgium. |
| 1,089,973 | 10/1954 | France. |
| 770,131 | 3/1957 | Great Britain. |

DONALL H. SYLVESTER, *Primary Examiner.*